US007245041B1

(12) United States Patent
Olson

(10) Patent No.: US 7,245,041 B1
(45) Date of Patent: Jul. 17, 2007

(54) OCEAN WAVE ENERGY CONVERTER

(76) Inventor: Chris F. Olson, 1915 Nocturne, Houston, TX (US) 77043

( * ) Notice: Subject to any disclaimer, the term of this patent is extended or adjusted under 35 U.S.C. 154(b) by 0 days.

(21) Appl. No.: 11/473,357

(22) Filed: Jun. 22, 2006

Related U.S. Application Data

(60) Provisional application No. 60/798,002, filed on May 5, 2006.

(51) Int. Cl.
*F03B 13/10* (2006.01)
(52) U.S. Cl. .............................. 290/53; 290/42; 290/54; 60/497; 60/499
(58) Field of Classification Search .................. 290/53, 290/42, 54; 60/497, 499
See application file for complete search history.

(56) References Cited

U.S. PATENT DOCUMENTS

| 855,258 | A | | 5/1907 | Neal | |
|---|---|---|---|---|---|
| 1,502,511 | A | | 7/1924 | Marvin | |
| 3,126,830 | A | | 3/1964 | Dilliner | |
| 4,124,182 | A | * | 11/1978 | Loeb | 244/153 R |
| 4,145,885 | A | | 3/1979 | Solell | |
| 4,241,579 | A | | 12/1980 | Borgren | |
| 4,408,454 | A | | 10/1983 | Hagen et al. | |
| 5,136,173 | A | * | 8/1992 | Rynne | 290/53 |
| 5,424,582 | A | * | 6/1995 | Trepl et al. | 290/53 |
| 5,708,305 | A | * | 1/1998 | Wolfe | 290/53 |
| 6,020,653 | A | * | 2/2000 | Woodbridge et al. | 290/53 |
| 6,392,314 | B1 | * | 5/2002 | Dick | 290/53 |
| 6,756,695 | B2 | * | 6/2004 | Hibbs et al. | 290/42 |
| 6,833,631 | B2 | * | 12/2004 | Van Breems | 290/42 |
| 7,045,912 | B2 | * | 5/2006 | Leijon et al. | 290/42 |

FOREIGN PATENT DOCUMENTS

| GB | 291265 | 5/1928 |
|---|---|---|
| WO | WO 81/00284 | 2/1981 |

* cited by examiner

*Primary Examiner*—Darren Schuberg
*Assistant Examiner*—Iraj Mohandesi
(74) *Attorney, Agent, or Firm*—David McEwing

(57) ABSTRACT

A long cylinder shaped beam is submerged in the ocean and suspended horizontally by multiple floats for converting ocean wave energy. The long length (at least the distance of the crest of two waves) and heavy weight of the beam, give the floats something stable to pull against. The weight of the beam pulling at the floats is transferred back and forth, as the ocean swells move over the beam, which activate machine components that may be installed in the beam, the floats or with rods connecting the floats to the beam. An individual float will not lift the beam except when the tide raises all the floats. The floats will pull and release the tension of the weight of the beam at randomly different times. The shape of the beam is straight. The ocean surface is continuously curving up and down and the beam will not bend to the shape of the ocean surface, but the floats will mimic the undulating or curvy shape of the ocean surface, and that motion actives the machine. The energy of the floats pulling against the elongated component is then turned into mechanical or hydraulic energy.

12 Claims, 5 Drawing Sheets

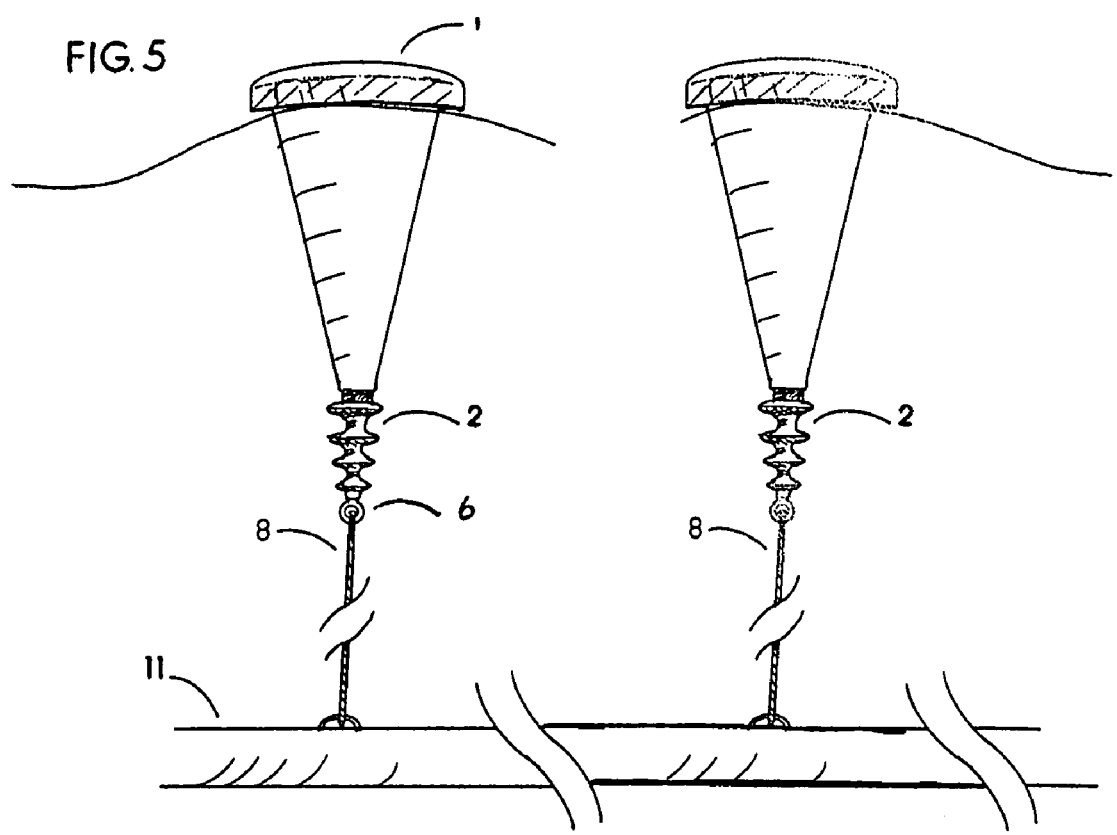

OCEAN WAVE ENERGY CONVERTER

RELATED APPLICATIONS

This application claims the benefit and priority to provisional application No. 60/798,002 filed May 5, 2006 and entitled "Ocean Wave Energy Converter" and which is incorporated herein by reference.

FIELD OF INVENTION

This invention pertains to an apparatus and method for converting wave motion into other forms of energy.

BACKGROUND OF INVENTION

Inventors have been trying to figure how to extract energy from the ocean for more than 150 years.

U.S. Pat. No. 4,408,454, issued 1983, discloses a fluid coupled wave generator array with sub sea structure wherein a sub sea support structure is coupled to floats in a Hagen array. This invention has many differences and problems, such as, many moving parts exposed to the salt water, it has to be tightly anchored or solidly fastened to the ocean floor, ships can collide with the apparatus. It does not use its own weight to pull against instead it pulls on the ocean floor. The floats are responsive to the relative motion between the floats and not the lifting of a weight like the present invention.

The invention anchoring system has to be adjusted continuously with a wench where the present invention needs no adjustment because it does not use the ocean floor to operate.

U.S. Pat. No. 855,258 issued 1907, discloses a wave motor that has the same differences and problems as U.S. Pat. No. 4,408,454 listed above.

U.S. Pat. No. 4,077,213 issued in 1978, discloses a wave driven generator that has different size floats connected together that float on the ocean surface and bends to the shape of the ocean surface.

There are many problems that have prevented ocean generators from going into production. They have numerous moving parts that are exposed to the salt water that will have a limited life under harsh and corrosive conditions. Many of the patents show these apparatuses solidly connected to the ocean floor (piers, land, poles, and scaffolding), which can be torn apart in bad weather. Many are tightly anchored to the ocean floor, which is very expensive (one float to one or more anchors). Many of these invention are anchored tightly straight up and down. When an anchor is pulled from the side it is very strong, but when an anchor is pulled straight up, it must be much stronger and deeper, which adds greatly to the cost. When an apparatuses is mounted solidly in a fixed position or relationship to the ocean floor, e.g., tightly fixed by an anchor, then it must be continuously adjusted for the different height in the tide, which is very difficult to do. The apparatuses that are mounted on a dock or a barge will have very little chance of surviving a hurricane or severe waves. Since waves have a long distance between them, many apparatuses will not produce power between wave motions.

The ocean waves have enormous energy, but there are many problems with trying to convert it to electricity. The ocean changes continuously with waves that range from 1 ft. swells to 100 ft. breaking waves and current that pulls in every direction. The height in the tide is changing continuously. The salt water is very corrosive and sea life attaches itself to everything. There are also many vessels and boats to contend with. Trying to make anything permanently fixed in place in the ocean is almost impossible.

SUMMARY OF INVENTION

The ocean wave energy converter is an apparatus of multiple components that converts the rise and fall of ocean waves into different forms of energy. The apparatus includes is a long heavy component (hereinafter termed "beam") that is suspended from a plurality of floats in the ocean parallel to the ocean surface. The apparatus also includes floats and rods connected to the beam. The apparatus includes a machine component that can be incorporated into or attached to a float, connecting rod, or the suspended beam. The machine component can include various sub-components, for example but not by way of limitation, flywheels, gears, gear rods, pawls, ratchets, pistons, cams, drive shafts, etc., for converting the vertical movement of the individual floats and rods to other forms of energy by acting against the substantial mass of the beam. It will be appreciated that the converted energy is not limited to mechanical energy but may be electrical or chemical energy. The mass of the beam is substantially greater than the mass of a single float and rod-cable combination.

The beam is suspended beneath the water surface (and below typical wave depth) by the buoyancy of multiple floats. The floats are at the ocean surface and move in response to the surface waves. The beam may be a long cylinder or other shaped object such as pipe, beam, or truss like object. Multiple spring controlled rods protrude from the beam, and the floats are connected to the rods. The float may have a cable that connects the float to the rod. The purpose of the beam is to transfer the weight of the long component from one float to the next float as ocean swells pass over the beam and engage individual floats. Stated differently, the purpose of the beam is to receive the individual and varying motion generated by the floats at the ocean surface and convert this received motion to other energy, whether mechanical, electrical or chemical. Each float takes it turn holding the weight of the beam, which increase the tension on the rod that protrudes from the beam. The rods that protrude from the beam will move in and out of the beam with enormous force and that tension and release of tension is converted into a different form of energy as a result of the motion of individual rods coupled to machine components. The rods may have an articulated or pivoting relationship with each float and with the gear rod that extends into the beam. The energy of the rod's motion may be converted by machine subcomponents inside the beam. The beams can be rigidly connected together to make squares, grid shapes or to increase its length. Connecting the beam in grid shapes provide an almost immovable object for the individual floats to interact with.

SUMMARY OF DRAWINGS

The accompanying drawings, which are incorporated by reference and constitute part of the specification, illustrate preferred embodiments of the invention. These drawings, together with the general description of the invention given above and the detailed description of the preferred embodiments given below serve to explain the principles of the invention.

The upward movement of the rack may also compress a retention spring, thereby storing energy for the next (cyclic) downward motion.

Figure 3:
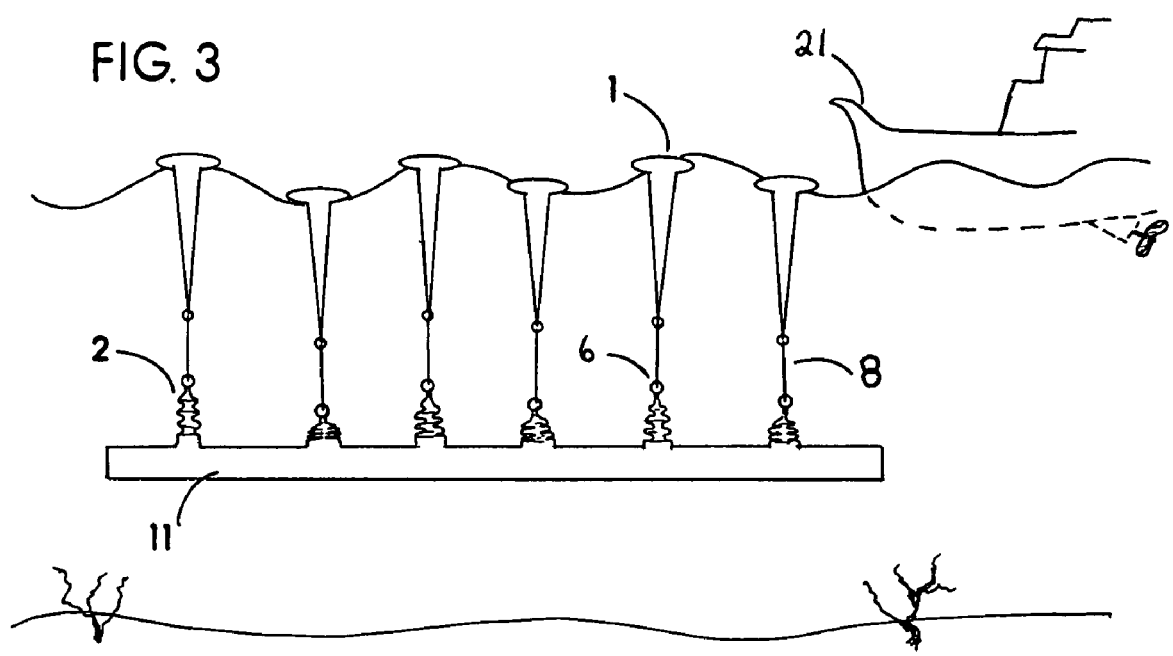

FIG. 3 illustrates another embodiment of the invention showing a plurality of floats. The floats are elongated to in order to hinder entanglement of the float cables with floating or other objects such as propellers of boats.

Figure 4:
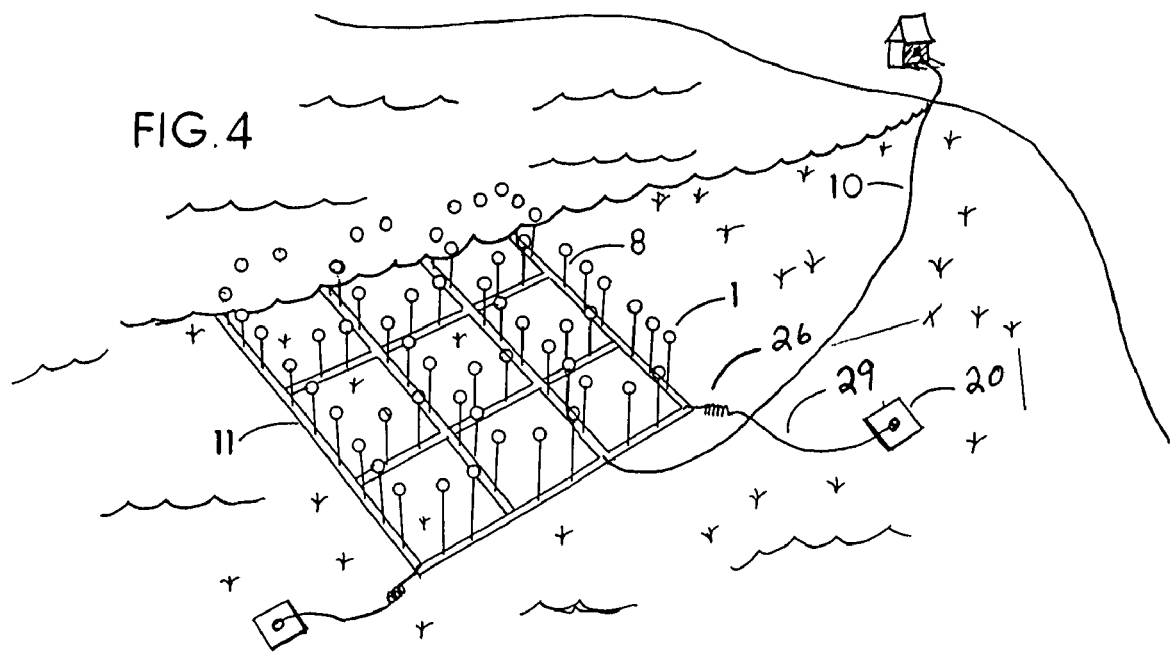

FIG. 4 illustrates an embodiment of the invention wherein an array of floats suspends a grid or other geometry of beams. The beams may contain internal machine components that may be turning rotating shafts as described in FIGS. 1 and 2 or, in another embodiment, may be powering the vertical motion of piston/cylinder combinations. The machine components may be furnishing power for other mechanical, electro-mechanical or chemical processes.

FIG. 5 illustrates an alternate embodiment wherein vertical motion of the float responding to wave undulations is converted to energy within the float.

DETAILED DESCRIPTION OF THE INVENTION

The apparatus takes into account the difficult obstacles that have prevented other devices from being successfully used as power generators. These are some of the problems this apparatus solves: (A) The apparatus has no moving parts that are exposed to the salt water. (B) The beam uses its own mass to act against the pulling forces of the floats, so it does not having to be tightly fastened to the ocean floor. (C) The beam does not have to mechanically adapt to the change in height of the tide. (D) The beam will be submerged deep enough so that ships cannot damage it. (E) The machine components may make energy in both directions as the individual floats add and release tension on the retention springs. (F) The beam is protected from storms and large waves because it is well below the ocean surface. (G) The huge cost saving of not having to anchor tightly to the ocean floor will make this apparatus more cost effective. (H) One anchor can hold numerous floats. (I) Beachfront property has too many swimmers and fisherman that make it unlikely that there will ever be many wave power generator allowed on the beach. This machine and its floats will be far from shore, and the floats will have a low profile. (J) The machine components of the apparatus may be designed to produce large amounts of electricity or energy for production of hydrogen. (K) The machine can quickly be raised to the surface for repairs and re-submerged.

The machine components are designed to work within the difficult ocean conditions. The beam of the apparatus will be deeply submerged so boats and vessels will not come in contact with it. It will also be submerged below the wave component. The floats will not harm or be harmed during contact with boats. Marine life will appreciate the shade. This machine components (which may be attached or incorporated into the beam) will be watertight using rubber bellows or other suitable materials to seal the moving parts. The anchoring will only be to keep the apparatus from drifting. The energy conversion operation of the apparatus does not require that the beam be secured to the ocean floor.

One attribute of the invention is that the machine component creates the stable mass that is suspended below the ocean surface and wave action from multiple buoyant floats. Each float independently moves in response to wave action. Each float thereby independently transfers motion having a vertical component to the machine. This component of vertical motion can be aggregated by the machine to convert other energy or perform other tasks. The long beam suspended from the surface with out being tightly tethered or solidly fastened to the ocean floor is completely different from any other patent. The machine components may synchronize the continuous action of many floats taking turns preventing this long weight from sinking to the ocean floor. The simple design of the apparatus will survive in the ocean where others fail. Floats working together to continuously re-distribute the weight of the heavy beam and convert the tension and release of tension into mechanical energy is very different from other patents that pull on the ocean floor or the land. The conversion or transfer of energy may occur with machine components within the suspended beam isolated from the turbulent ocean surface. This will increase reliability and minimize damage to power components in ocean storms.

These are multiple benefits of this invention: (A). In the preferred embodiment, the apparatus is of sufficient length to put the float and rod components within several waves and wave troughs at the same time, which gives the suspended beam stability or inertia in an unstable environment. (B). The beam possesses sufficient mass and inertia which is resistive to motion of any individual float or group of floats. This resistive mass gives the machine components enormous power, as the weight of the beam is transferred back and forth from float to float. Using multiple floats in multiple waves keeps the generator spinning much faster and does not giving the flywheel a chance to stop spinning.

In many patents, there is only one float being activated by one wave and there is a period between waves that a generator will stop working. (C). This machine (attached to or operated within the beam) can be operated in very deep water because it hangs from the surface and only needs the anchor to keep it from drifting off. (D) This machine is safer because it will be submerged out of reach of ships, and the floats will be designed so they can be run over with out damage to ships or the floats. The floats will extend deep in the water, so the cables they are attached to will not be caught in ships propellers. (E) This apparatus can be built in shorter sections and then rigidly bolted together during the installation. Section can be attached rigidly to make the beam longer or to make shapes like squares or grid shapes (hereinafter "grids"). This will make the beam heavier, more stable and cover more area with fewer anchors. That will makes it almost as stable as attaching the floats to the ocean floor.

It will be appreciated that the apparatus is not needed to be attached to the ocean floor but rather tethered to a ship. This tether arrangement permits mobility of the apparatus. For example the apparatus may be towed from a severe storm or hurricane. Further the ship may tend to the power converting apparatus of the invention. The vessel may serve as a mother ship.

The expense of installing devices like this will be great if we are to use them to power our coastal cities, so they must be very dependable and last a long time to recapture the investment. This apparatus is designed to be durable and powerful. The machine components incorporated into the apparatus can be used, for example but not limitation, to make electricity, extract hydrogen from sea water or desalinate sea water. Using the oceans energy instead of burning fossil fuels would greatly help our planet.

The machine component can include various sub-components, for example but not by way of limitation, flywheels, gears, gear rods, pawls, ratchets, pistons, cams, drive shafts, etc., for converting the vertical movement of the individual floats and rods to other forms of energy by acting against the substantial mass of the beam. It will be appreciated that the converted energy is not limited to mechanical energy but may be electrical or chemical energy.

Figure 1:
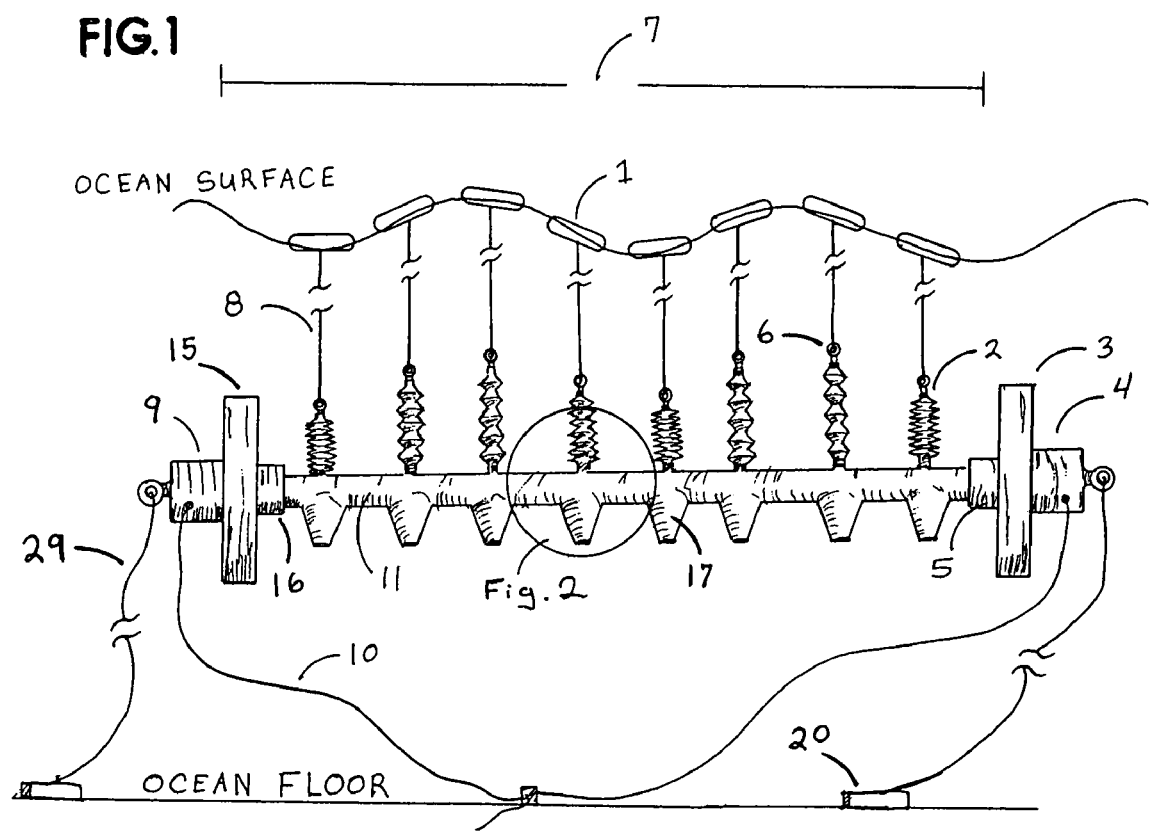
FIG. 1 illustrates one embodiment of the device subject of the invention including the multiple floats positioned at the undulating ocean surface and variously experiencing the wave swells and troughs. Also illustrated are connective cables attached to each float and attached to rods to the beam. The combined buoyancy of the floats suspends the beam in the water. Also illustrated are fly wheels which may be located at one or both ends of the beam and rotated by shafts and other machine components internal to the beam. The fly wheel may serve as a component of an electrical generator. Connective electrical cables are also illustrated. Also illustrated are anchors that may be used in one embodiment to control the drift of the apparatus from ocean currents. In another embodiment, the apparatus may be tethered to a ship. The ship may be used to move the apparatus to areas of desired ocean activity and to serve as a mother ship in tending the operation of the energy converting components of the apparatus.

Referring to the drawings, FIG. 1, the apparatus of the invention includes a long beam component 11 that is submerged horizontally in the ocean and connected by multiple rods 6 that are attached to multiple floats 1 on the ocean surface. It will be appreciated that the up and down component of motion of the rods 6 is substantially perpendicular to the orientation of the beam component 11. The rods may have an articulated relationship to the float and to the rack (gear rod) as discussed further. Mechanical components transferring the vertical component of motion of the rods to another energy form may be contained in a plurality of component housings 17. The beam's length (at least the distance of the crest of two waves) 7 and heavy weight provide a resistive mass to give the individual floats and rod combinations something to pull and push against to operate the machine components. In the embodiment illustrated, fly wheels 3, 15 gear boxes 5, 16 and generators 4, 9 are machine components located at each end. As will be discussed further herein, the machine component may contain two drive shafts turning in the same direction by action of the gear rods.

Electrical energy may be produced by the rotation of the fly wheels by well understood principles and the apparatus may contain electrical cables 10. The apparatus may also be tethered 12 to an anchor 20 on the ocean floor to control drift.

In one embodiment, the beam is suspended beneath the wave depth. Also because the multiple floats supporting the beam are simultaneously experiencing different wave actions (swells and troughs) the movement of the beam is limited. The beam is preferably of an elongated or other shape such that the attached floats are simultaneously experiencing multiple wave swells and troughs. Therefore there is constant "up and down" action of the attached rods attached to the beam and powering the machine components.

The floats will move up and down at different times. The buoyant lifting force of a float rising in a swell may be cancelled by the action of a float descending into a trough. As will be explained more fully below, the lifting force moves a rack and ratchet (machine component) in a first direction. The "relaxed" float descending into a trough, is moving a different gear rod and ratchet in a different direction. Each is contributing to the energy converting mechanism. There may not be a net lifting of the beam of the apparatus but a transfer of its weight pulling on the floats.

Figure 2:
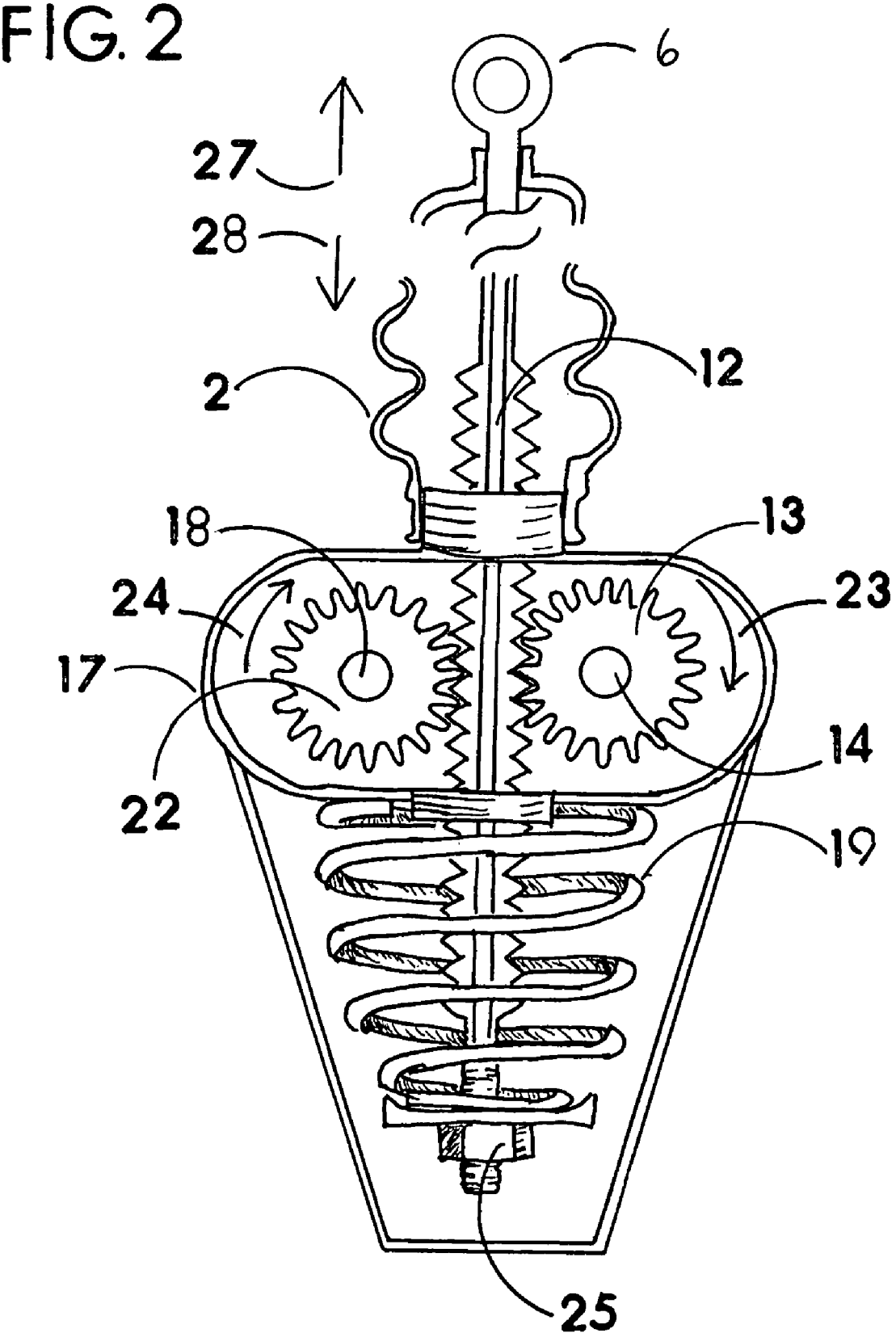
FIG. 2 is a detail of one embodiment of the invention wherein the vertical motion of the rod (caused by the rising and falling of individual floats in response to ocean waves) is transferred into rotational motion. In the illustrated embodiment, a modified rack and ratchet mechanism is used. Each rod end forms or communicates with a rack (hereinafter "gear rod"). Each gear wheel (ratchet) is allowed free rotation in one opposing direction. Downward vertical motion of the gear rod turns each ratchet. A first of the two ratchets is controlled by a pawl (not shown) that rotates a drive shaft in one direction. The second ratchet rotates freely. The upward motion of the rack turns each ratchet in the opposing direction and the second ratchet, also controlled by a pawl, now rotates a drive shaft in the same (power) direction with the first ratchet now rotating freely.

Referring to the drawings, FIG. 1 and FIG. 2, an example of energy conversion in provided. Each float and rod combination will be attached to a rack (gear rod) 12 that extend into the machine (contained within a beam). The gear rod 12 may have a pivoting or articulated relationship with the cable 8 attached to the floats 1. The gear rod assembly may also include a retention spring 19 and attached to the gear rod by a retention nut 25 on the underside of the machine. The gear rod 12 will be pulled back and forth through the machine by the waves pulling on the float. The return spring 19 may pull the gear rod back as the wave recedes. Stated differently, it may be appreciated that the spring may retract the gear rod when the tension is lessened by the float entering a wave trough. Rubber bellows 2 will make a watertight seal where the gear rod enters the machine.

FIG. 2 illustrates a cross sectional view of a component housing 17 the machine component (contained within a beam). In the example illustrated, each gear rod 12 will activate two ratchets 13, 22 on either side of the gear rod 12. The first ratchet 13 will activate as the float 1 pulls against the machine (vector arrow 27) and power a drive shaft 14 in direction shown by vector arrow 23 using subcomponents understood by persons skilled in the art, for example a pawl. The second ratchet 22 will rotate freely. The second ratchet will be activated as the retention spring 19 pulls the gear rod 12 back (vector arrow 28). When activated, the second ratchet powers a drive shaft in direction 24. The first ratchet 13 correspondingly rotates freely using mechanisms understood by persons skilled in the art.

The ratchet 13 is attached to a drive shaft 14 that extends the length of the beam 11, which has multiple ratchets attached to it from the other gear rods 12. There may be two drive shafts 14, 18 that activate separately. The first drive shaft 14 operates from the force of the floats being pulled on by the ocean waves. The second drive shaft 18 is activated by the force of the retention spring 19 pulling the gear rod 12 back after the wave passes. Each drive shaft may be connected to a separate gearbox 5, 16 flywheel 3, 15 and generator 4, 9 that are located on opposite ends of the beam. (Reference FIG. 1)

The electricity that is generated passes through a wire 10 that goes to a power station. The electricity may be converted to D.C. current and back to A.C. The apparatus may be anchored 20 to the ocean floor only to hold it in place. In another embodiment, the apparatus may be attached to a ship 21.

FIG. 3 illustrates an embodiment of the floats having a long tapered undersides so the rods can be shorter, to prevent the floats from tangling or being damaged by ships 21 as they pass over the floats.

Referring to the drawing FIG. 4, the beams can be rigidly connected to each other to make them longer or to make shapes or grids to increase their stability and mass. The anchor 20 will have slack in the cables 29 to adjust for change in tide, current and the cables will have springs 26 to adsorb extreme forces.

In another embodiment, the ratchet may power a single drive shaft. Power may be transferred by the upward movement of the gear rod moving the ratchet wheel. The counter part return of the gear rod (powered at least in part by the retention spring) may allow free rotation of the ratchet wheel. It will be appreciated that in another embodiment, for example, a compressed fluid component may be used to power the return of the gear rod.

It will be appreciated that the vertical motion of the float and rod combination may be utilized in multiple ways with components organized in multiple configurations. For example, the up and down motion of the rod may be used to drive a piston and cylinder combination which may be used as a pump. The pressure of the pump may be utilized, for example, to create a pressure gradient across a suitable membrane used in desalination of ocean water. Other examples or applications will be apparent to persons skilled in the art after having had the benefit of this disclosure and such examples and applications are claimed within the scope of this invention.

FIG. 5 illustrates an embodiment of the invention wherein the float 1 is attached to a rod 6 which in turn is secured to the beam 11 suspended beneath the ocean surface. The rise and fall of the float caused by wave action pushes the rod in and out of the float. This allows mechanical energy to be available for useful purposes. The moving parts may be protected by the rubber or similar material baffle 2.

In addition, this specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

I claim:

1. An ocean wave energy converter utilizing the movement of floats from the rise and fall of ocean waves into different energy comprising:
   (a) a plurality of floats moveable in response to ocean waves;
   (b) a plurality of rods wherein each float is connected to at least one rod;
   (c) a beam suspended beneath the ocean surface by the plurality of the rods wherein the beam is of mass and shape such that it remains in a relative stable position in relation to the plurality of floats and a movement of an individual float partially transfers the mass of the beam; and
   (d) a machine component for moving in response to the movement of a float in relation to the beam.

2. The apparatus of claim 1 wherein the machine component for moving in response to movement of the floats to the beam is located proximate to the connection of the floats to the respective rods.

3. The apparatus of claim 1 wherein the machine component for moving in response to the movement of the floats to the beam is located proximate to the connection of the rods to the beam.

4. An ocean wave energy converter transforming the rise and fall of ocean waves into different forms of energy comprising:
   a) a beam suspended beneath the ocean surface by a plurality of floats and rods;
   b) incorporating a machine component within a float component;
   c) at least one float component comprising a moveable connection to the attached rod wherein the float component moves in relation to the rod.

5. The machine of claim 4 wherein the motion of the rod within the float moves a piston within a cylinder.

6. The machine of claim 4 wherein the motion of the rod within the float includes turning a shaft within the float.

7. A method of creating energy by the transfer of mass from the rise and fall of an ocean surface to energy comprising the steps of:
   a) placing a plurality of floats in the water;
   b) attaching connecting rods to the floats whereby the rods move in response to movement of the floats;
   c) moveably attaching the connecting rods to a machine component;
   d) incorporating a machine component within a beam component that is suspended in the water beneath the floats;
   e) using movement of the rods to move components within the machine component.

8. The method of claim 7 further comprising moving a shaft.

9. The method of claim 7 further comprising moving a piston.

10. A method of transforming the rise and fall of an ocean surface to energy comprising the steps of:
    a) placing a plurality of floats in the water;
    b) attaching a plurality of connecting rods wherein one rod is moveably attached to each float;
    c) attaching the connecting rods to an beam wherein the beam is suspended in the water beneath the floats;
    d) using movement of the floats relative to the rods to move machine components within a float.

11. The method of claim 9 further comprising moving a piston.

12. The method of claim 9 further comprising moving a shaft.

* * * * *